United States Patent [19]

Masson

[11] 4,032,682

[45] June 28, 1977

[54] MAGNETIC RECORDING ELEMENT AND METHOD FOR MAKING SAME

[75] Inventor: Claude Jeanine Masson, Paris, France

[73] Assignee: Eastman Kodak Company, Rochester, N.Y.

[22] Filed: July 17, 1975

[21] Appl. No.: 596,924

[30] Foreign Application Priority Data

July 30, 1974 France .............................. 74.26355

[52] U.S. Cl. ................................ 428/309; 427/130; 428/480; 428/500; 428/521; 428/523; 428/539; 428/900
[51] Int. Cl.² ...................... B05D 5/12; B32B 5/16
[58] Field of Search .......... 427/130, 131; 428/304, 428/309, 329, 480, 483, 523, 539, 521, 500, 900

[56] References Cited

UNITED STATES PATENTS

| | | | |
|---|---|---|---|
| 3,216,846 | 11/1965 | Hendricx et al. | 427/130 |
| 3,240,621 | 3/1966 | Flower, Jr. et al. | 427/130 |
| 3,398,011 | 8/1968 | Neirotti et al. | 117/65.2 |
| 3,437,510 | 4/1969 | Diaz | 427/130 |
| 3,473,960 | 10/1969 | Jacobson et al. | 427/130 |
| 3,634,137 | 1/1972 | Akashi | 428/539 |
| 3,761,311 | 9/1973 | Perrington et al. | 428/480 |

Primary Examiner—Cameron K. Weiffenbach
Attorney, Agent, or Firm—A. P. Lorenzo

[57] ABSTRACT

An element for magnetic recording is comprised of a substrate or support coated on one of its surfaces with one or more magnetic layers comprising a dispersion of magnetizable particles in a binder. At least one of these magnetic layers has a porous structure formed by precipitation of at least part of the binder in the form of fine particles, with air included between said particles. Flexible magnetic tapes having such porous coatings are practically free from transverse incurvature, and have an excellent aptitude for calendering.

12 Claims, No Drawings

MAGNETIC RECORDING ELEMENT AND METHOD FOR MAKING SAME

BACKGROUND OF THE INVENTION

1. Field of the Invention

The present invention relates to an element for magnetic recording and, more particularly, to a flexible magnetic element practically free from transverse incurvature, and having an excellent aptitude for calendering. The invention also relates to a method for making such an element.

2. The Prior Art

In general, tapes for the magnetic recording of sounds or of images comprise a flexible support, coated on one of its surfaces with one or more layers comprising a dispersion of magnetizable particles, such as gamma-ferric oxide, chromium dioxide, ferrites, or metallic powders, in a suitable binder. As binders, a variety of different organic polymers can be used, e.g., vinyl polymers such as polyvinyl chloride, polyvinyl butyral, or copolymers or vinyl acetate and vinyl chloride; copolymers of vinylidene chloride and acrylonitrile; copolymers of acrylic and/or methacrylic esters; copolymers of styrene and butadiene; terpolymers of acrylonitrile, vinylidene chloride, and maleic anhydride; cellulose derivatives; reticulated or non-reticulated polycondensates, such as polyamides, polyesters, and polyurethanes; or mixtures of these binders with one another.

Often the completed magnetic tapes, in the dry state, have a tendency to assume a transverse incurvature, which becomes greater as the support is thinner, the oxide is finer, and the binder is used in greater amount. This incurvature results mainly from the contraction undergone by the binder or mixture of binders during the drying operation, subsequent to application of the layer of magnetic composition to the support. Consequently, the magnetically coated side of the layer becomes concave and the opposite side becomes convex.

This phenomenon of transverse incurvature is extremely disturbing, both during the subsequent operations of finishing the magnetic tapes and during travel of finished tapes through the recording and reproduction apparatus. In the latter case, the magnetic tapes which display the defect of transverse incurvature, contact only imperfectly the magnetic heads for recording and/or reproduction, which is detrimental to the quality of the recording and/or of the playback or reading, and which may even render the magnetic tape unusable. This phenomenon is particularly detrimental in the case of magnetic tapes designed for the recording of images, due to the relatively high speeds between the heads and the magnetic layer.

Various processes have been suggested to correct this disadvantage of transverse incurvature of magnetic tapes. For example, it has been suggested to avoid transverse incurvature by adding plasticizers to the binder of the magnetic layer, but the incorporation of a large amount of plasticizer changes the properties of the magnetic layer which becomes soft and tends to stick and to soil the magnetic heads. It has also been suggested to incorporate into the magnetic layer inert pigments, such as kaolin or titanium dioxide, but this process has the disadvantage of reducing the cohesion and the adherence of the magnetic layer. It has further been suggested, as described in French Pat. No. 2,035,255, to eliminate the transverse incurvature of magnetic tapes by treating the back of said tapes, completely dried, by chlorinated solvents such as dichlorethane, dichlorethylene, and dichloromethane, but this process has the disadvantage of requiring a supplementary operation during the manufacture of magnetic tapes.

On the other hand, it is known that, particularly in the case of magnetic recording of images, the magnetic tapes must not only be flat, but also display a very smooth surface, so as to assure intimate physical contact of the magnetic tape with the magnetic recording and reproducing heads. In order to obtain such a smooth surface, the magnetic tapes usually are submitted to one or more calendering operations after the magnetic layer has been applied and has dried.

SUMMARY OF THE INVENTION

Therefore, the object of the present invention is to provide an element for magnetic recording which is practically free from transverse incurvature and which has an excellent aptitude for calendering.

The tape for magnetic recording according to the invention, which is practically free from transverse incurvature and which displays an excellent aptitude for calendering, comprises a flexible support or substrate coated on one of its surfaces with one or more magnetic layers consisting of a dispersion of magnetizable particles in a binder, and which is characterized in that at least one magnetic layer has a porous structure, formed by precipitation of at least part of the binder in the form of very fine particles, with inclusion of air between said particles.

The magnetic tape according to the invention is practically free from transverse incurvature, as shown in the following examples, and is subject to none of the disadvantages often observed during finishing operations, e.g., difficulty in winding on a core. Additionally, due to its transverse flatness, the magnetic tape rests perfectly against the recording and/or reading heads during travel through magnetic recording and/or reproduction apparatus, thus making it possible to obtain optimum quality of recording and reading.

Moreover, due to the porous structure of the magnetic layer, the magnetic tape according to the invention displays an excellent aptitude for calendering. A calendering operation, carried out either cold or hot, is particularly efficient and produces a considerable improvement in the smoothness of the surface of the tape. This characteristic of the magnetic tape according to the invention is particularly advantageous for the magnetic recording of images, because the magnetic tape must display a very smooth surface to provide satisfactory recording and playback of high frequency sounds or images.

The magnetic layer of the tape for magnetic recording according to the invention contains, preferably, as magnetizable substance, an iron oxide in the cubic or acicular shape, possibly doped by metals such as cobalt, nickel, chromium, zinc, manganese, etc., particularly an acicular gamma-ferric oxide such as described, e.g. in French Pat. No. 2,129,841, or an acicular ferrous-ferric oxide such as described, e.g. in French Pat. No. 2,199,155, in the name of the applicant. It may also contain, as magnetizable substance, chromium dioxide, ferrites, metallic particles, such as iron, cobalt and/or nickel, etc., alloy particles.

The magnetic layer may, in addition, contain additives well known to those skilled in the art, e.g., a dispersing agent, such as oleic acid, or a lubricant, particularly a mixed carbonic ester, such as described in French Pat. No. 2,094,663.

In a general manner, for the manufacture of the tape for magnetic recording according to the invention, one prepares the magnetic composition by forming a dispersion, e.g., in a ball-bearing crusher, of the magnetizable substance in the selected polymer or polymers, by using as dispersing medium a solvent mixture such as described hereinafter, optionally with the incorporation of suitable additives. One then applies the resulting composition to a flexible support by means of any coating method known to those skilled in the art. One uses, e.g., a support of cellulose triacetate, polyvinyl chloride, polycarbonate, etc., and advantageously of polyester, such as poly(ethylene terephthalate). After application of the magnetic composition to the support, one submits the product obtained to a drying operation and obtains a magnetic tape having a magnetic layer displaying a porous structure as specified.

THE PREFERRED EMBODIMENTS

According to one embodiment of the invention, the magnetic tape comprises at least one magnetic layer having a porous structure containing as binder a single polymer, said layer being obtained by microprecipitation of the single polymer constituting the binder from a solution comprising two or more solvents having different vapor pressures. Due to differential evaporation rates of the various constituents of the solvent mixture, during the drying of the magnetic layer that is applied to the support, interstices are left in the layer.

It is known that it is possible to obtain resinous layers having a porous structure by dissolving a polymer in a solvent mixture comprising a relatively volatile solvent and a liquid diluent (or a mixture of diluents) which is a poor solvent for the polymer and has a volatility lower than the volatility of the main solvent. After application of the composition in the form of a layer to a support, the drying operation brings about the evaporation of the more volatile solvent, which causes the precipitation of the polymer in the form of fine particles, leaving interstices between the particles of this polymer. Such a process has been described in numerous patents, e.g., in U.S. Pat. Nos. 2,306,525, 2,519,660, 2,665,262, and in French Pat. Nos. 1,370,780 and 2,054,869, but none of these patents describes the utility of porous binder layers for magnetic recording tapes.

According to this first embodiment of the invention, one prepares the composition serving for the application of the magnetic layer of the magnetic tape by dispersing magnetizable particles in a solution comprising a binder, such as partially hydrolyzed vinyl acetate-vinyl chloride copolymer, or polyvinyl butyral, dissolved in a solvent mixture or system comprising a solvent for the polymer and a diluent (or a mixture of diluents) less volatile than the main solvent. The main solvent may be a good solvent for the selected polymer, or a mediocre solvent which, when associated with a diluent constitutes a mixture that is a good solvent for the polymer.

After application of a layer of the composition to a support, and drying, one obtains a magnetic layer having a cellular, porous structure, due to the fine and progressive precipitation of the binder as the two solvents evaporate at different rates.

This embodiment of the invention is illustrated in Example 1, wherein the solvent mixture that is used comprises methylene chloride as the main solvent, and butanol as the diluent.

EXAMPLE 1

In a 1-liter ball-bearing crusher, one prepares a dispersion of magnetic particles comprising the following constituents:

| | |
|---|---|
| Gamma-ferric oxide | 100 g. |
| Rhodopas AXRH* | 35 g. |
| Oleic acid | 3 g. |
| Methylene chloride | 225 ml. |
| Butanol | 75 ml. |

*Rhodopas AXRH is a partially hydrolyzed copolymer of vinyl acetate and vinyl chloride sold by Rhone-Poulenc.

One applies this composition, to a wide 12-$\mu$ thick poly(ethylene terephthalate) support, so as to obtain a 9-$\mu$ thick layer after drying at a temperature between 40° and 70° C, whereupon one obtains a product having a porous magnetic layer. The wide sheet is then split so as to obtain 35-mm wide tapes which will serve as samples. One then measures on these samples the transverse incurvature and the state of the surface (percentage of contact area) in accordance with techniques described hereafter.

For a comparison, one prepares a product for magnetic recording which will serve as test samples, by proceeding in the following manner:

One prepares a magnetic dispersion according to the usual technique by using the same quantities of magnetic oxide, of binder, and oleic acid as above, and a single solvent, methylisobutylketone, as dispersing medium:

| | |
|---|---|
| Gamma-ferric oxide | 100 g. |
| Rhodopas AXRH | 35 g. |
| Oleic acid | 3 g. |
| Methylisobutylketone | 300 ml. |

The composition is applied to a support sheet as described above, and dried at a temperature between 40° and 70° C. After drying, the sheet is slit into 35 mm wide tapes and measurements of the transverse incurvature and of the state of the surface are performed.

The curvature of the product sample prepared according to the invention is 5$x$, whereas it is 14$x$ for the test sample, the transverse incurvature being thus much less for the product according to the invention.

The state of the surface is evaluated by the percentage of contact area, and one obtains the following results, before calendering, and after calendering at 80°–90° C (at a pressure between 450 kilograms and 500 kilograms per linear centimeter), for the product according to the invention and for the comparison test sample.

| | Percentage of Contact Area | |
|---|---|---|
| | Comparison Test Sample | The Invention Sample of Example 1 |
| before calendering | 23 | 30 |
| after calendering | 68 | 85 |

Thus, the product according to the invention displays, after calendering, a state of the surface clearly improved over the comparison test sample obtained by the usual processes.

To measure transverse incurvature, one uses the following method. One evaluates the incurvature or curvature on 35 mm wide tape samples, by visual comparison with a series of gauges of known curvature, scaled in units $x$ corresponding to a 0.8 mm distance, sag or deflection measured along a normal to a chord and the farthest point on the curve of the gauge per 35 mm arc. Thus, a curvature of $5x$ means a deflection of 4 mm across the 35 mm tape width.

The aptitude for caldendering of the magnetic tapes, i.e., the improvement of the state of the surface of these tapes by means of calendering, is determined by measuring the "percentage of contact area" before and after calendering. One determines this value of "percentage of contact area" with respect to a reference surface consisting of the hypotenuse surface of a total-reflection prism. The value of an incident luminous flux being equal to $\phi$, the flux reflected by the hypotenuse surface is equal to $\phi$, and it becomes equal to $\phi'$ when one applies against this surface, while maintaining it under pressure, a sample of the magnetic tape, the magnetic layer being in contact with said surface. The "percentage of contact area" is equal to $\phi'/\phi \times 100$. The value of the percentage of contact area increases with the flatness of the surface of the magnetic layer, i.e., with the state of the surface of the tape.

According to a second advantageous embodiment of the invention, the tape for magnetic recording comprises at least one magnetic layer having a porous structure, containing as binder a mixture of at least two polymers, said layer being obtained by microprecipitation of one of the polymers in the midst of the other polymer or other polymers, by using at least two polymers having a limited compatibility, dissolved in a solvent mixture or system. Differential evaporation of components of the solvent mixture causes, during the drying of the magnetic layer applied to the support, the microprecipitation of one of the polymers in the midst of the other polymer or other polymers, which leaves interstices in the layer.

According to this second embodiment, one prepares the composition serving for the application of the magnetic layer of the magnetic tape according to the invention, by dispersing magnetizable particles in a binder consisting, e.g., of two polymers having a limited compatibility, such as a mixture of two differnt copolymers of vinyl acetate and vinyl chloride, or cellulose acetobutyrates of different compositions, or else the following combinations: a copolymer of vinyl acetate and vinyl chloride, and a copolymer of vinylidene chloride and acrylonitrile; copolymer of vinyl acetate and vinyl chloride, and polyvinyl butyral; copolymer of vinyl acetate and vinyl chloride, and copolymer of vinyl chloride and methylacrylate. As dispersing medium, one uses a solvent mixture comprising at least one relatively volatile main solvent for the binder polymers and a diluent which is a poor solvent for the binder polymers and is less volatile than the main solvent. One selects the solvent mixture in such a manner than one of the polymers is less soluble in it than the other and, during the drying of the layer of magnetic composition applied to the selected support, a disturbance of the equilibrium polymers-solvent mixture is produced which increases the incompatibility of the polymers and causes the microprecipitation of the less soluble polymer in the midst of the other polymer and the formation of a porous structure.

The solvent mixture comprises, e.g., a chlorinated solvent such as methylene chloride, or a ketone such as acetone or methylethylketone, and a dilutent such as an alcohol, e.g., butanol.

EXAMPLE 2

In a 1-liter ball-bearing crusher, one prepares a dispersion of magnetizable particles comprising the following constituents:

| | |
|---|---|
| Gamma-ferric oxide | 100 g. |
| Rhodopas AX 85–15* | 8 g. |
| Rhodopas AXRH | 27 g. |
| Oleic acid | 3 g. |
| Methylene chloride | 240 ml. |
| Butanol | 60 ml. |

*The Rhodopas AX 85–15 is a copolymer of vinyl chloride (85%) and vinyl acetate (15%) sold by Rhone-Poulenc.

As in Example 1, one applies the composition obtained to a 12-$\mu$ thick poly(ethylene terephthalate) support sheet, so as to obtain a 9-$\mu$ thick layer after drying at a temperature between 40° and 70° C, whereupon one obtains a product having a porous magnetic layer. After slitting, as described in Example 1, one carries out on the samples the measurements of the transverse incurvature of the state of the surface.

The curvature of the product of Example 2 is $4x$, whereas it is $14x$ for the same comparison test sample as in Example 1, the transverse incurvature thus being much less for the product according to the invention.

The measurements of the state of the surfacing of the product of Example 2 and of the comparison test sample before calendering, and after calendering with heat at 80° – 90° C, yield the following results:

| | Percentage of Contact Area | |
|---|---|---|
| | Comparison Test Sample | The Invention Sample of Example 2 |
| before calendering | 23 | 28 |
| after calendering | 68 | 84 |

As in Example 1, after calendering one notes the very good state of the surface of the product prepared according to the invention.

The porosity of the magnetic layer is evaluated by the decrease in thickness of the layer on calendering at 80° – 90° C, at a pressure between 450 kilograms and 500 kilograms per linear centimeter. The decrease in thickness is about 30 – 35 percent for the product of Example 2 whereas it is about 15 – 20 percent, under the same conditions, for the same comparison test sample as in Example 1. These results show the higher porosity of the magnetic layer of the product sample prepared according to the invention.

EXAMPLE 3

In a 1-liter ball-bearing crusher, one prepares a dispersion of magnetizable particles comprising the following constituents:

| | |
|---|---|
| Gamma-ferric oxide | 100 g. |
| Butvar B 72 A* | 10 g. |
| Rhodopas AX 85–15 | 10 g. |
| Methylene chloride | 228 ml. |
| Butanol | 57 ml. |

*Butvar B 72 A is a polyvinyl butyral sold by the Shawinigan Company.

One applies the composition obtained to a support, as described in Example 1, and dries at a temperature between 40° and 70° C. One obtains, after slitting, 35 mm wide flat tapes (curvature deflection 5x) carrying a porous magnetic layer. The tapes are very easily calendered as shown by a substantial improvement of the state of the surface after calendering with heat at 80°–90° C.

EXAMPLE 4

In a 1-liter ball-bearing crusher, one prepares a dispersion of magnetizable particles comprising the following constituents:

| | |
|---|---|
| Gamma-ferric oxide | 100 g. |
| Eastman cellulose acetobutyrate 381–1/2* | 5 g. |
| Eastman cellulose acetobutyrate 171–15** | 15 g. |
| Acetone | 165 ml. |
| Butanol | 90 ml. |

*Cellulose acetobutyrate comprising 2% by weight of free hydroxyl groups, sold by Eastman Kodak Company.
**Cellulose acetobutyrate comprising 15% by weight of free hydroxyl groups, sold by Eastman Kodak Company.

One then proceeds as in Example 3, except that one dries at a temperature between 40° and 100° C, and obtains flat tapes (curvature deflection 5x) having a porous magnetic layer, which are easily calendered.

EXAMPLE 5

In a 1-liter ball-bearing crusher, one prepares a dispersion of magnetizable particles comprising the following constituents:

| | |
|---|---|
| Gamma-ferric oxide | 100 g. |
| Ixan W N 82 B* | 12 g. |
| Rhodopas AX 85–15 | 8 g. |
| Methylethylketone | 256 ml. |
| Butanol | 29 ml. |

*Ixan W N 82 B is a copolymer of vinylidene chloride and acrylonitrile sold by Solvay & Cie SA.

One then proceeds as in Example 3 and obtains flat tapes (curvature deflection 5x) having a porous magnetic layer, which are easily calendered.

The invention has been described in detail with particular reference to preferred embodiments thereof, but it will be understood that variations and modifications can be effected within the spirit and scope of the invention.

I claim:
1. A magnetic recording element comprising a support coated on one of its surfaces with at least one magnetic layer comprised of a dispersion of magnetizable particles in resinous binder, said binder comprising a single copolymer of vinyl acetate and vinyl chloride, or a mixture of copolymers of vinyl acetate and vinyl chloride of different compositions, or a mixture of a copolymer of vinyl acetate and vinyl chloride with polyvinyl butyral, or a mixture of polyvinylidene chloride-acrylonitrile copolymer with a copolymer of vinyl acetate and vinyl chloride, or at least one cellulose acetobutyrate composition, or a mixture of copolymer of vinyl acetate and vinyl chloride with a copolymer of vinyl chloride and methyl acrylate; said at least one magnetic layer having a porous structure and comprising fine particles of said binder with interstices included between particles, and said elements exhibiting a transverse incurvature of not more than 4 mm across a 35 mm wide strip thereof.

2. A magnetic recording element according to claim 1 wherein said support is a flexible tape.

3. A method for making a magnetic recording element comprising:
preparing a dispersion of magnetizable particles in a solution of resinous binder consisting essentially of at least one copolymer of vinyl acetate and vinyl chloride, or at least one cellulose acetobutyrate composition, or a mixture of a copolymer of vinyl acetate and vinyl chloride with either polyvinyl butyral or with a copolymer of vinylidene chloride and acrylonitrile or with a copolymer of vinyl chloride and methyl acrylate, dissolved in a solvent system comprising butanol and either methylene chloride, acetone, or methyl ethyl ketone;
coating said dispersion on a substrate; and
causing said solvents to evaporate, leaving a magnetic layer having a porous structure on said substrate.

4. A method in accordance with claim 3 wherein said substrate is a flexible tape, and wherein the resulting magnetic recording element is practically free from transverse incurvature.

5. A method in accordance with claim 3, also comprising calendering said magnetic layer.

6. A method in accordance with claim 3 wherein said resinous binder is a mixture of a copolymer of vinyl acetate and vinyl chloride with polyvinyl butyral.

7. A method in accordance with claim 3 wherein said resinous binder is a mixture of two different cellulose acetobutyrates, and said solvent comprises acetone and butanol.

8. A method in accordance with claim 3 wherein said resinous binder is a mixture of a copolymer of vinylidene chloride and acrylonitrile with a copolymer of vinyl acetate and vinyl chloride, and wherein said solvent comprises butanol and methyl ethyl ketone.

9. A method in accordance with claim 3 wherein said resinous binder is at least one copolymer of vinyl acetate and vinyl chloride, and wherein said solvent system comprises butanol and methylene chloride.

10. A method in accordance with claim 9 wherein said resinous binder is only one copolymer of vinyl acetate and vinyl chloride.

11. A method in accordance with claim 9 wherein said resinous binder is two different copolymers of vinyl acetate and vinyl chloride.

12. A method for making a magnetic recording element comprising:
preparing a dispersion of magnetic particles in a resinous binder-solvent system selected from the group consisting of:
a. at least one copolymer of vinyl acetate and vinyl chloride dissolved in a mixture of butanol and methylene chloride,
b. polyvinyl butyral and a copolymer of vinyl acetate and vinyl chloride dissolved in a mixture of butanol and methylene chloride,
c. cellulose acetobutyrate dissolved in a mixture of butanol and acetone, and
d. a copolymer of vinylidene chloride and acrylonitrile, and a copolymer of vinyl acetate and vinyl chloride, dissolved in a mixture of butanol and methyl ethyl ketone;
coating said dispersion on a substrate;
causing said solvents to evaporate, leaving a magnetic layer having a porous structure on said substrate; and
calendering said magnetic layer.

* * * * *